J. H. Power,
Mortising Machine,
Nº 115.  Patented Jan. 31, 1837.
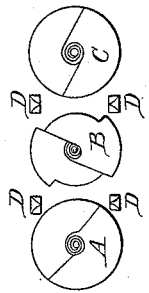
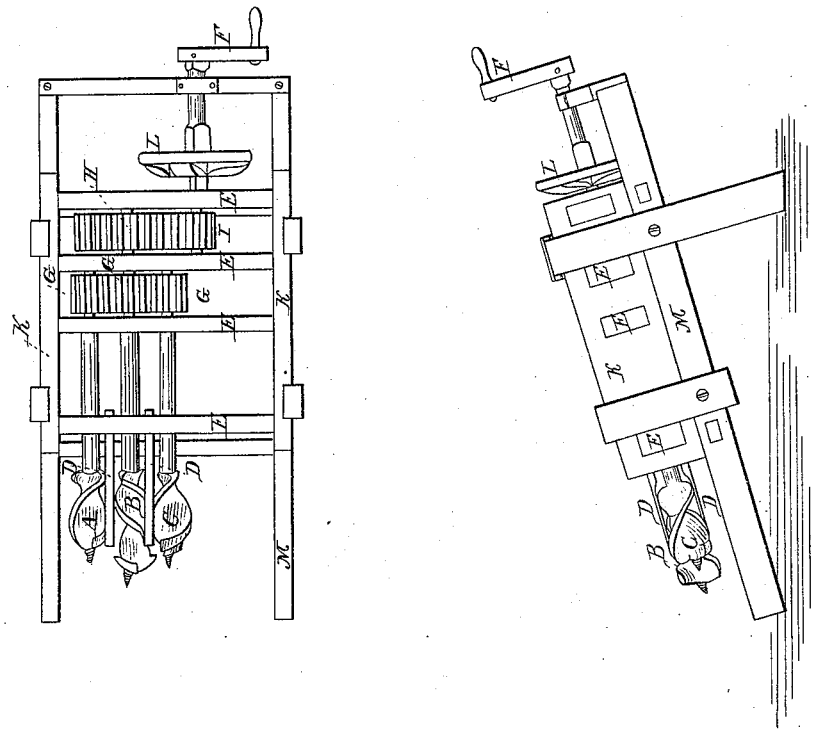

UNITED STATES PATENT OFFICE.

JOHN H. POWER, OF NORWALK, OHIO.

MACHINE FOR BORING AND MORTISING.

Specification of Letters Patent No. 115, dated January 31, 1837.

*To all whom it may concern:*

Be it known that I, JOHN H. POWER, of Norwalk, in the county of Huron and State of Ohio, have invented a new and useful Machine for Boring and Mortising; and I do hereby declare that the following is a full and exact description of the machine, reference being had to the annexed drawings.

This machine consists of three augers A, B, C and four chisels, D D D D situated in a frame E, E and turned with a crank, F by which the whole operation is performed. One of the augers B is a left hand auger, or bores by turning to the left, also three fourths of an inch from the screw, or point, there is an offset, of half an inch, which diminshes it in size all the way up to the shank, or round part of the auger. The other two augers are common screw augers, all situated parallel with each other in the frame, the left hand auger being in the center, and projecting so far beyond those on each side, as to place their point behind the off-set named above, so that in the operation, the center auger going before, those on each side will cut into the center hole, leaving four small projections to be removed by the chisels, which are situated in the first bar of the frame to complete the mortise. The augers are of the usual length, and on the end instead of a handle there is on each of them a small cast iron cog wheel G, which work into each other, also, the shank of the center auger is long enough to receive a second cog wheel H, larger than the others, as, the proportion of five to two, working into this, and turned by the crank, is a small one I the same size of the small ones on the augers,—the frame is sufficiently large to receive the augers, and consists of wooden sides K, and cast iron bars E, the first bar is situated just above the twist of the augers the shanks passing through holes in the center of those bars, the three small cog wheels work between the second and third bars, the large cog wheel and the small one working in it and turned by the crank K work between the third and fourth bars, this completes the machine. There is a fly wheel L on the crank shaft. The frame is confined together with wedges, half dovetail tenants being made on the ends of the bars. This machine is placed on a suitable frame M somewhat inclined leaving the points of the augers the lowest; and also, to give convenience to turn the crank. The machine thus situated, will operate as follows: by turning the crank to the right, the small cog wheel on its shaft will work into the large one on the end of the center auger and turn it to the left, the small cog wheel on the center auger working into the cog wheels on the outside augers will turn them to the right, and the chisels situated in the first bar of the frame in which the augers are placed remove the projections left by the cut of the augers and thus by the simple operation of turning the crank this machine completes the mortise. This machine may be used for boring only without the chisels, and only one or two of the augers used as occasion requires. This machine is designed to be used for boring and mortising posts, for post and rail fence, for framing houses, barns, stables, bridges, &c.

What I claim as my invention, and desire to secure by Letters Patent, is—

The projections on the end of the left hand auger as above described, and the combination of the augers and chisels.

JOHN H. POWER.

Witnesses:
ABRAHAM B. WOMBAUGH, Jr.,
JOSEPH B. TILLINGHAST.